UNITED STATES PATENT OFFICE.

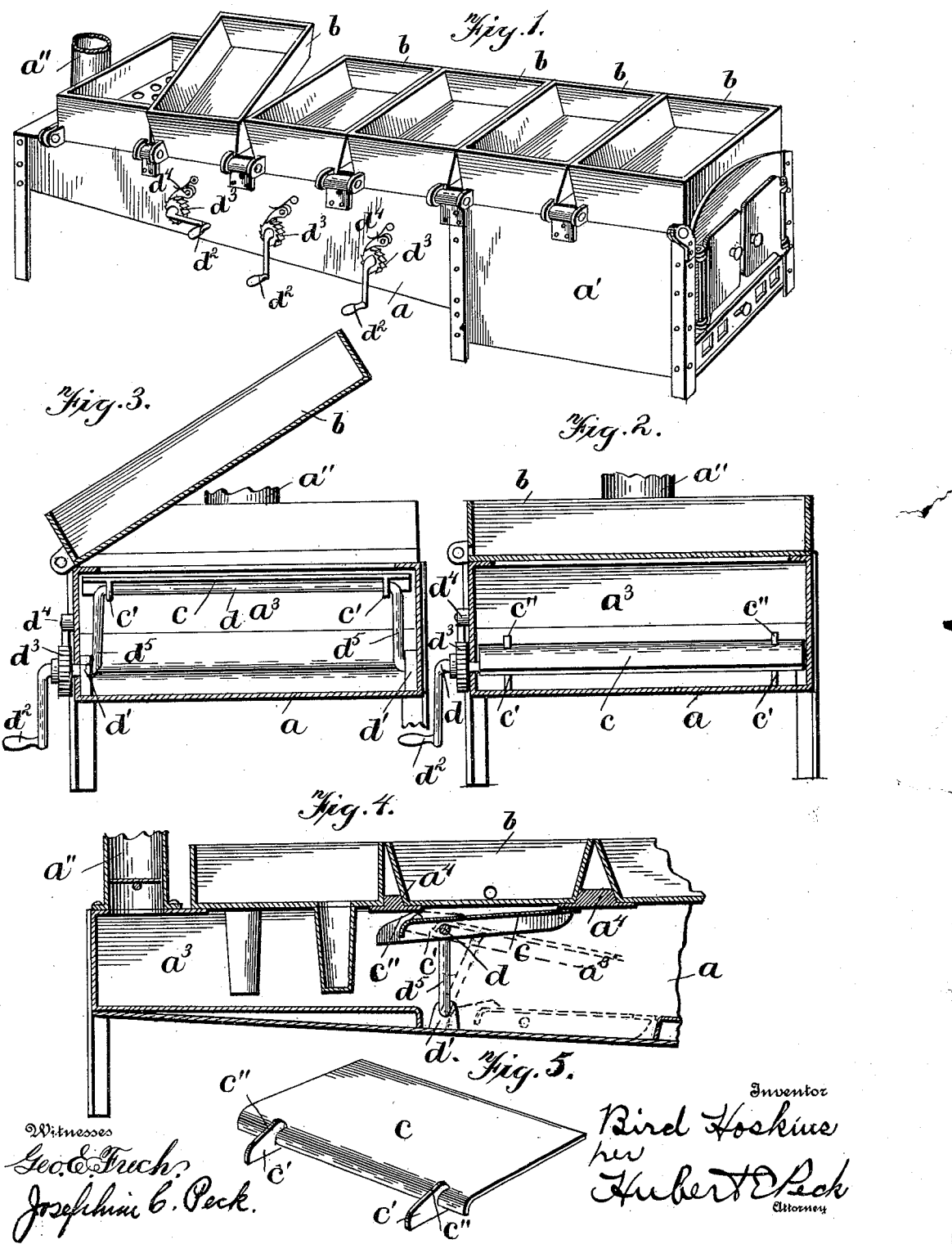

BIRD HOSKINS, OF MIDDLEFIELD, OHIO.

EVAPORATING-PAN.

SPECIFICATION forming part of Letters Patent No. 640,135, dated December 26, 1899.

Application filed March 2, 1898. Serial No. 672,321. (No model.)

*To all whom it may concern:*

Be it known that I, BIRD HOSKINS, a citizen of the United States, residing at Middlefield, in the county of Geauga and State of Ohio, have invented certain new and useful Improvements in Evaporators; and I do hereby declare the following to be a full, clear, and exact description of the invention, such as will enable others skilled in the art to which it appertains to make and use the same.

This invention relates to certain improvements in evaporator-pans; and the objects and nature of the invention will more fully appear hereinafter.

The invention consists in certain novel features in construction and in combinations and in arrangements of parts, as more particularly specified in detail and set forth in the following description.

Referring to the accompanying drawings, illustrating one out of several constructions within the scope of and for carrying out my invention, Figure 1 is a detail perspective of an evaporating-pan embodying my invention, one of the hinged or removable pans shown elevated or tilted. Fig. 2 is a cross-sectional view through one of the movable pans, the arch, and the combined valve and deflector for such pan in its lowered normal position. Fig. 3 is a corresponding view showing the pan elevated and said combined valve and deflector elevated to close the opening in the arch normally receiving the pan. Fig. 4 is a sectional view taken longitudinally of the arch and at right angles to the plane of the sections of Figs. 2 and 3, showing said combined valve and deflector in a different position. Fig. 5 is a detail perspective of the valve and deflector.

My invention relates to that class or type of evaporators wherein a long body, frame, or arch is provided, having a furnace at one end and a smoke-discharge at the other and a series of closely-arranged syrup or sap pans on the arch, the pans of which may be hinged at corresponding ends, so that any pan can be raised from the arch and tilted to "syrup off" the same, or the pans, if connected, permit a flow of sap or juice from one pan to the next pan by means of siphons and may be removable entirely from the arch. The arch is usually open beneath each pan, so that the heat and products of combustion come in direct contact with the bottom of the pan. When a large evaporator is in full blast with the boiling sap or juice flowing into the syrup-pan, the syrup-pan has to be separately raised or removed to discharge the syrup, say, about every half-hour. As generally constructed and used, the smoke and flame flue is thus left open beneath each pan when elevated, thereby permitting soot and ashes to escape into the other pans of the evaporator and also most materially cutting off the draft of the furnace and permitting smoke and heat to escape through such openings every time a pan is elevated, hence scorching the syrup while the pan is partially empty and reducing the temperature at the remaining pans and most materially retarding the progress of the process, causing delay and great waste of fuel and heat and the production of a poor or low grade of syrup. In the evaporators generally employed attempts have been made to prevent these disadvantages by shutting the dampers at the front of the arch and in the smoke-pipe, and thus completely shutting off the furnace whenever a pan is elevated; but such method seriously retards the progress of the process by practically cutting off the heat and stopping the boiling of the contents of all the pans whenever a single pan is raised. In fact, such method in no way obviates the disadvantages stated, as the flue is still left entirely open whenever a pan is raised.

It is the object of my invention to so improve and add to the construction of such evaporators as to obviate such disadvantages by providing means to close the opening into the flue beneath each pan whenever such pan is elevated or when the pan is in operative position to deflect the heat against the bottom of any pan, if so desired.

In the drawings, $a$ is the long horizontally-disposed body of the evaporator, having a furnace $a'$ at one end and a smoke discharge or offtake $a''$ at the opposite end. Said body of the evaporator is formed internally with a heat-passage, smoke-flue, or arch $a^3$ from the furnace to the offtake usually, although not necessarily inclined upwardly at the bottom from the furnace to the smoke pipe or discharge. The top of the body or arch is formed open with or without supporting cross-pieces $a^4$, and the syrup-pans $b$ are usually arranged closely on the top of the arch or body transversely thereof, with the series of pans extending from one end of the body to the other end or to the smoke-pipe. The pans rest on the cross-bars and top side edges of the arch, preferably so that the bottoms of the pans form the top surface or closing means of the smoke and heat passage—that is, there is an opening beneath each pan into said passage. The pans are movable, preferably, by being hinged at one end, so that each pan can be tilted or raised vertically to discharge syrup therefrom. Hence when a pan is thus elevated the smoke and heat passage would ordinarily be entirely open beneath the same in the class of evaporators thus far described and as generally constructed.

I provide a combined valve and deflector $c$. These can be arranged beneath one or more of the pans of the evaporator. The valve and deflector $c$ can be formed of sheet metal or other material of a size to completely close and cover the opening into the flue or passage beneath its particular pan.

Suitable supporting and operating means extending to and operative from the exterior of the evaporator are provided, whereby the operator can manipulate the valve as desired. The valve is arranged to normally rest on the bottom or floor of the arch or smoke-passage in such a way as not to obstruct or retard the draft. It is shown provided with transverse bottom ribs $c'$ to rest below the bottom of the passage and permit the top of the valve to drop about to a level with the bottom of the flue, a depressed recess or seat in the floor of the flue being preferably provided to receive the valve. Inclined or beveled projections $c''$ extend rearwardly from the rear edge of the valve and preferably project above the plane of the upper surface of the valve for the purposes hereinafter pointed out. If desirable, said bottom flanges or ribs $c'$ can be so formed or inclined at their lower edges as to deflect the heat upwardly toward the pan above when the valve is resting on the bottom of the passage. As a convenient and desirable means for operating the valve, I show a crank-shaft $d$, extending transversely of the smoke-passage beneath the valve and mounted to turn in the bearing-boxes $d'$ $d'$ in or on the bottom of the smoke-passage, so that the axis on which said shaft turns will be preferably beneath the rear portion of the pan—that is in rear, in the line of draft, of the center of the pan. One end of the shaft is carried out through the side wall of the evaporator and at the exterior thereof provided with a crank or turning handle $d^2$, whereby the shaft is rocked and the valve operated.

Means are provided to hold the shaft in the desired position or adjustment. For instance, I show a ratchet-wheel $d^3$, rigid on the shaft, and a pawl $d^4$, pivoted to the side of the evaporator for engaging and locking the ratchet-wheel. The shaft is provided with the long cranked portion $d^5$ beneath the valve and loosely journaled or confined to the valve. I show said cranked portion passing through and journaled in said depending ribs or flanges at a point preferably nearer the rear edge of the valve than the front edge thereof, although my invention is not limited to these features. When the valve is in its normal position on the floor of the passage, said crank lies beneath the valve and projects toward the furnace end of the evaporator or forwardly, and the crank should be of such length as to hold or support the valve when elevated up against the under side of said cross-pieces or top pan-supporting edges of the evaporator sides.

It will be observed that when the parts are in their normal positions and it is desired to elevate a pan the operator first swings the shaft-handle down, (the pawl then runs loosely over the ratchet-wheel,) and thereby swings the cranked portion of the shaft upwardly and rearwardly, carrying the valve upwardly and rearwardly and in a forwardly and downwardly inclined position, the rear end moving up first and being elevated, and then as the cranked portion of the shaft continues up and rearwardly, the said rear edge projections of the valve engage the cross-pieces beneath the rear edge of the pan, and slide along under the same, and the rear edge of the valve is closed up against the under side of the top supporting edges of the evaporator sides and said cross-pieces, thereby closing the opening beneath the pan and permitting elevation thereof without the disadvantageous results hereinbefore specified. The pawl-engaging ratchet-wheel locks the shaft and valve against retrograde movement and holds the valve in the desired elevated position. The rear edge of the valve preferably does not engage the rear cross-piece; but usually said projections of the valve engage such cross-piece and hold the surface of the valve down slightly from said cross-piece. The opening beneath the pan is thus maintained closed without requiring the operator to hold the shaft in such position, and the pan can be raised, and as the valve is slightly below the top in direct contact with the pan the same can be again filled with sap without danger of scorching, as the pan is shielded from the direct impact of the hot products of combustion. When the pan has been returned to its normal position, the pawl can be released and the shaft and valve returned to their normal positions.

It will be noted that the valve when raised first assumes an upwardly and rearwardly inclined position, with its upper edge below an intermediate portion of the pan, and that the pawl will hold the valve at any position. Hence the valve when held in such position will deflect and direct the hot products of combustion up against the pan should an increased heat be desired at any particular pan.

The heat can be concentrated at the pan to a greater or less degree by raising or lowering the valve. Also the rearward and upward projections at the back edge of the valve permit the draft to pass over the valve and over the rear edge thereof, thereby allowing the rush of hot air, &c., to sweep dust and ashes from the upper surface of the valve and prevent the same blowing off the valve when the same is elevated and the pan is removed. The rearward projections at the back edge of the valve guide the same in its movements and prevent the same catching or hanging on the pan or cross-piece.

What I claim is—

1. In an evaporator, a body having a furnace and a smoke-flue, and formed with a top opening into said flue to receive a removable sap-pan, a vertically-movable valve within and normally resting on the floor of the flue and when elevated formed to close said opening, and means operative from the exterior of the evaporator for raising said valve and for locking the same in the desired adjustment.

2. In an evaporator, a body or furnace having a smoke-flue provided with a top opening to receive a movable pan, and a tiltable deflector within and normally resting on the floor of the flue, and means for tilting or inclining the same to deflect the heat up against the bottom of the pan, substantially as described.

3. In an evaporator, a furnace having a smoke-flue with a top opening to receive a movable pan, and a vertically-movable valve normally resting on the floor of the flue so as not to obstruct the draft and formed to move vertically and fit the under edges of the top of the flue at said opening and to close the opening, and operating means.

4. In an evaporator, a smoke-flue having a top opening, a movable pan resting on the flue over said opening, a vertically movable and tiltable valve within the flue and formed to close said opening, said valve having stops or projections at its rear edge, and actuating and locking means.

5. An evaporator having a smoke-flue with an opening to receive a movable pan, the combined valve and deflector within the flue having the rearward and upward guiding and stop projections at its rear edge and the bottom flanges, and the operating crank-shaft passing loosely through said flanges intermediate the lengths thereof.

6. In an evaporator, a heater provided with a smoke and heat flue formed at the top to receive a pan, and having a bottom depressed seat, in combination with a valve normally resting at the bottom of the flue in said seat thereby avoiding obstruction of the draft, and provided with operating means for elevating the valve, substantially as described.

7. In an evaporator, the combination of a heater provided with a smoke and heat flue having an outlet and top opening, a movable pan, a valve movable from an intermediate point and operative from the exterior of the flue, said valve normally withdrawn and arranged outside of the direct line of draft through the flue, and arranged to fit the edges of said opening and completely close the same and lie outside of the line of draft through the flue.

8. In an evaporator, the combination of a heater provided with a smoke and heat flue having a smoke-outlet and provided with a top pan-opening and pan-supporting edges, a movable pan normally resting on said edges and closing said opening, and a valve mechanism for closing said opening comprising a movable valve arranged transversely of said flue beneath said opening and edges and movable bodily with both transverse edge portions engaging said pan-supporting edges to close said opening and prevent interruption of the draft when a pan is elevated, said valve having a withdrawn normal seat or position out of the direct line of draft through the flue and an operative closing position against said supporting edges out of the direct line of draft through the flue, and supporting and operating mechanism for the valve, substantially as described.

In testimony whereof I affix my signature in presence of two witnesses.

BIRD HOSKINS.

Witnesses:
JAMES W. CALDWELL,
ELLIS S. HOSKINS.